United States Patent
Hickman

(10) Patent No.: US 7,106,343 B1
(45) Date of Patent: Sep. 12, 2006

(54) METHOD AND PROCESS FOR VIRTUAL PAINT APPLICATION

(76) Inventor: Carter Hickman, 5330 Mild Drove, St. Louis, MO (US) 63129

( * ) Notice: Subject to any disclaimer, the term of this patent is extended or adjusted under 35 U.S.C. 154(b) by 200 days.

(21) Appl. No.: 10/819,839

(22) Filed: Apr. 7, 2004

Related U.S. Application Data

(60) Provisional application No. 60/461,043, filed on Apr. 8, 2003.

(51) Int. Cl.
*G09G 5/02* (2006.01)

(52) U.S. Cl. ............ 345/589; 345/592; 345/594; 345/597; 345/629

(58) Field of Classification Search ............ 345/589, 345/592, 594, 597, 629
See application file for complete search history.

(56) References Cited

U.S. PATENT DOCUMENTS

| | | | |
|---|---|---|---|
| 6,710,777 B1 * | 3/2004 | Chun et al. ............ 345/545 |
| 6,717,584 B1 * | 4/2004 | Kulczycka ............ 345/589 |
| 6,734,873 B1 * | 5/2004 | Herf et al. ............ 345/629 |
| 6,853,385 B1 * | 2/2005 | MacInnis et al. ......... 345/629 |

* cited by examiner

*Primary Examiner*—Matthew C. Bella
*Assistant Examiner*—Mike Rahmjoo
(74) *Attorney, Agent, or Firm*—Kevin L. Klug

(57) ABSTRACT

A method and process for virtual paint application which allows a user to apply a virtual combination of paints and/or graphics to an object and visually observe and print the resultant object as if it had been physically painted. The method and process is especially useful for virtually painting vehicles with colors supplied from paint company charts and then allowing a user to print the resulting combination and thereafter allowing the user to supply the finished printout to a painter for physical paint application. The method and process is unique in its ability to preserve highlights and shadows of the original image to ensure that the virtual paint application is an accurate representation of the object after the physical paint is applied. The method and process further allows a user to supply a photo of a personal object such as a vehicle or house and after processing, apply the desired virtual paint to the object.

19 Claims, 17 Drawing Sheets
(12 of 17 Drawing Sheet(s) Filed in Color)

METHOD AND PROCESS FOR VIRTUAL PAINT APPLICATION

This application claims priority of U.S. Provisional Patent Application No. 60/461,043, filed Apr. 8, 2003.

A computer program listing appendix submitted herewith on a compact disc is incorporated-by-reference within this application. A transmittal letter complying with 37 CFR 1.52(e) is attached hereto.

The description portion of this application contains a computer program listing consisting of more than (300) lines. Said computer program listing complies with 37 CFR 1.96(c). The names of the files contained on each of the two compact discs, labeled "COPY 1" and "COPY 2", incorporated herein are "paint.txt", their date of creation is Aug., 17th, 2003 and their sizes in bytes are each 290 Kilobytes. The two compact discs labeled "COPY 1" and "COPY 2" are identical.

BACKGROUND OF THE INVENTION

The present invention relates in general to a computer assisted virtual paint application process and method of use, and more particularly, to a novel application, process, and method of optimally applying a user desired paint color, scheme, and/or graphics to a computer image of a desired vehicle in order to determine the look of said vehicle on a computer screen prior to actually physically painting said vehicle. The art of the present invention also applies to and functions with numerous other physical objects which are capable of capture via a digital image such as a house or boat.

This present invention represents a unique method and process for virtually applying paint colors, paint fades, and graphics to an object displayed on a computer prior to physically applying the aforementioned. The method and process is especially useful for evaluation of various paint color schemes, combinations, and graphics on various types of vehicles prior to actual physical application of the aforesaid. The method and process is implemented with the apparatus of a computer and the computer code or software of the present art. The method and process is also capable of operation over the internet when hosted by a server computer.

The apparatus, in a preferred embodiment, allows a user to preview different paint colors on a variety of vehicles. (i.e. cars, trucks, motorcycles, etc.) In a preferred embodiment, said paint colors represent industry standard colors which are commercially available. It also enables the user to preview color combinations such as fades where two colors are on the same vehicle. In addition, the user can add multiple layer graphics to the vehicle. These graphics include flames, two tones, pinstripes and other miscellaneous graphics. Once a graphic has been selected the user can manipulate the size, rotational angle, and position of the graphic to create a limitless number of custom paint designs. The apparatus program also features a hand draw section where the user can actually draw a graphic on the vehicle. Once completed, the on-screen graphic design can be printed with the computer and together with the industry paint color(s) defined may be utilized as a reference by the physical painter.

A technical difficulty encountered with prior art attempts at virtual paint applications is proper rendering of shadows and highlights on the source image when a different virtual paint color is applied to the source image. Prior art attempts have unsuccessfully applied a user desired color to an existing source image only to substantially or completely eliminate the surface features of the object depicted in the source. Said surface features typically are represented by shadows or highlights of the original color. The present art process, apparatus, and method preserves the shadows and highlights and further removes original color remnants in order that the user may obtain a realistic representation of the source object with a new and user selected paint color or graphic application.

The computer software or files of the preferred embodiment of the present art is created using two programs, Adobe Photoshop and Macromedia Flash MX. The vehicle image which requires virtual painting as captured in a digital form is first manipulated by the computer utilizing a photo editing program such as Adobe Photoshop, Corel Photo Paint or equivalent. Using multiple layers the highlights and shadows are separated by the photo editing program. Mask tools within said photo editing software are used to eliminate any unpaintable parts of the vehicle (i.e. tires, mirrors etc.) These layers are preferably saved as .SWF or .PNG files for import into Macromedia Flash MX. Once the layers are imported into Flash MX they are used to create the color, graphics, and hand draw ability. Both Adobe Photoshop and Macromedia Flash MX are capable of running on multiple computer platforms utilizing multiple operating systems including but not limited to Microsoft Windows, Apple operating systems, and Unix. The aforesaid is further shown and described in the Figures. Alternative embodiments may utilize other photo editing software packages other than Adobe Photoshop, provided said software allows for multiple layer placement of various vehicle portions.

Once the aforesaid layers are defined, the aforesaid files are processable by the Macromedia Flash MX player program. For use with vehicle virtual painting, in Macromedia Flash MX, the user first selects the type of vehicle which he/she desires to apply paint and graphics to. The aforesaid is performed by mouse clicking the load vehicle tab as seen in the Figures and then selecting from the pop up menu as presented in the Figures. The user then virtually selects and applies the basecoat and topcoat paints as shown in the Figures. The user may select types of topcoats from a pop-up menu as shown in the Figures. The user may also select fade position, width, and rotation for the aforesaid virtual paint application. If the user desires to utilize the fade options, the user chooses the fade paint colors which are desired and sets the mask for said colors. The user may then rotate, position, and adjust the size of various fade positions. All of the aforesaid are applied to one or more layers which were originally defined and deemed paintable during the Adobe Photoshop or equivalent operation.

Unique to the present art is the method of creating the aforesaid layers for processing by Macromedia Flash MX or equivalent in order to accurately represent shadows and highlights. The vehicle of interest is first typically provided with a background in a Jepeg or similar image format. A color layer, onto which the user's desired color is placed, is then placed above the original image. A matte shape layer of the paintable portions of the vehicle or object is then typically created manually by carefully tracing the colored portions of the vehicle and placing said matte shape layer above the aforesaid color layer. This matte layer creates a hole or see through template which may be used to filter all but the object color portions and allow the aforesaid color layer to show through, yet also allows the background to show through. A black shadow layer utilizing an inverted grayscale rendition of the area to be painted is then added above the color layer and between the first matte shape layer to create shadows. A solid white highlight layer is then added between the aforesaid black shadow layer and the matte shape layer with a non-inverted grayscale rendition of the area to be painted to create highlights. The contrast or threshold of the aforesaid mattes are adjusted to provide the desired shadow and highlight effects. Also, a desaturation layer is placed above the aforesaid to remove reflection remnants of the original color. Those skilled in Adobe Photoshop or an equivalent understand that absolute black matte portions represent areas through which the underlying images are visible and absolute white matte portions are areas through which the underlying images are blocked with the grayscale between the aforesaid absolutes providing opacity therebetween.

The aforesaid layer collection, without the color layer, is saved as a single layer in a Macromedia Flash format such as an .SWF file for export to and use with the Macromedia Flash Player. The Flash Player places user desired colors, stripes, graphics, etc. under the aforesaid layer collection, i.e. as the color layer, which are then seen through the aforesaid matte layers created with Photopaint or equivalent. The original .SWF file acts as a filter which allows a new chosen color placement only on the object desired and also preserves the shadows and highlights on the original object.

Accordingly, it is an object of the present invention to provide a method and process for virtual paint application which in a preferred embodiment is capable of allowing a user to virtually apply paint colors or graphics to an object, i.e. vehicle, house, boat, etc., and observe the look of said object without the need to physically paint said object.

Another object of the present invention is to provide a method and process for virtual paint application which utilizes easily obtainable and commercially available photo editing software for implementation and easily obtainable and commercially available authoring environment software for user interface.

A further object of the present invention is to provide a method and process for virtual paint application which may be utilized remotely over a network, including the internet, through player software such as Macromedia Flash or an equivalent.

A still further object of the present invention is to provide a method and process for virtual paint application which allows a user to especially design a vehicle or other object color and graphics scheme, print the design, and provide said print to a painter for application to the physical object.

SUMMARY OF THE INVENTION

To accomplish the foregoing and other objects of this invention there is provided a method and process for virtual paint application which allows virtual paint and graphics color scheme application to a digital picture of an object, especially a vehicle, prior to actual physical application. In a preferred embodiment, the process first utilizes Adobe Photoshop or an equivalent photo editing package to create a collection of layers, usually four or five, having mattes of varying opacity, contrast, and hue in order to isolate the object from background, to also preserve shadows and highlights, and to remove remnant artifacts respectively. The process next utilizes an authoring environment such as Macromedia Flash or equivalent to place a user desired color or graphics below the aforesaid layers and view the virtual paint application, either locally or over the internet. Internet applications typically require use of the player version of Macromedia Flash or equivalent. Alternative embodiments may utilize only the aforesaid photo editing software without the Flash player in non-internet applications.

As aforesaid, in a preferred embodiment, the software of the present art is created using two programs Adobe Photoshop and Macromedia Flash MX. The vehicle or object image which requires virtual painting and is captured in a digital form is first manipulated by the computer utilizing a photo editing program such as Adobe Photoshop or equivalent. Using multiple layers the highlights and shadows are separated by the photo editing program. Mask tools within said photo editing software are used to eliminate any unpaintable parts of the vehicle (i.e. tires, mirrors etc.) or background. These layers are preferably saved as .SWF or .PNG files for import into Macromedia Flash MX. Once the layers are imported into Flash MX they are used to create the color, graphics, and hand draw ability. Both Adobe Photoshop and Macromedia Flash MX are capable of running on multiple computer platforms utilizing multiple operating systems including but not limited to Microsoft Windows, Apple operating systems, and Unix. The aforesaid is further shown and described in the Figures. Alternative embodiments may utilize other photo editing software packages other than Adobe Photoshop, such as Corel Photopaint, provided said software allows for multiple layer placement of various vehicle portions with transparency.

Once the aforesaid layers are defined, the aforesaid files are processable by the Macromedia Flash MX player program included herewith. For use with vehicle virtual painting, in Macromedia Flash MX, the user first selects the type of vehicle which he/she desires to apply paint and graphics to. The aforesaid is performed by mouse clicking the load vehicle tab as seen in FIG. 1 and then selecting from the pop up menu as presented in FIG. 7. The user then virtually selects and applies the basecoat and topcoat paints as shown in FIG. 2. The user may select types of topcoats from a pop-up menu as also shown in FIG. 3. The user may also select fade position, width, and rotation for the aforesaid virtual paint application. If the user desires to utilize the fade options, the user chooses the fade paint colors which are desired and sets the mask for said colors. The user may then rotate, position, and adjust the size of various fade positions. All of the aforesaid are applied to one or more layers which were originally defined and deemed paintable during the Adobe Photoshop operation. Preferably the aforesaid are applied below said one or more layers.

If the user desires a graphic pattern such as flames, he/she may click on the graphics tab to activate the graphics application portion of the program. FIG. 4 shows the graphics application pop-up portion with a graphics style and color selected. The user may select from a plurality of graphics and graphic colors. The user may also rotate, size, vertically and horizontally position, and apply a fade to said graphics. Again, all of the aforesaid are applied to one or more layers which were originally defined and deemed paintable during the Adobe Photoshop operation.

The apparatus of the present invention further allows the user to draw a user desired design onto the vehicle selected under the "DRAW" tab. The user may select a brush width and color and further place said user design over or under the graphics previously applied. FIG. 5 illustrates said hand drawn design.

Upon completion of the aforementioned, the user may print the users design through the computer on which the apparatus software is running or under the Macromedia Flash MX player plug-in. FIG. 6 illustrates the print pop-up screen which is shown prior to printing.

It is important to note that Macromedia Flash MX is capable of producing an executable file ".exe" into which is embedded the Macromedia Flash MX player. This allows the user to use the functional features of the program without a Macromedia Flash MX player plug-in installed on the computer. Macromedia Flash MX also allows the code to be saved in a non-executable form. This non-executable form requires that a user has a Macromedia Flash MX plug-in for use within a browser. The non-executable form is especially useful for internet virtual paint application.

The aforesaid operations of the software running under Macromedia Flash MX are shown and described in the flow chart form in FIGS. 8, 9, & 10.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

Numerous other objects, features and advantages of the invention should now become apparent upon a reading of the following detailed description taken in conjunction with the accompanying drawings, in which:

FIG. 1 shows a screen view of the load vehicle tab in Macromedia Flash where the user first selects the type of vehicle which he/she desires to apply paint and graphics to.

FIG. 9A shows a continuation of the flowchart of FIGS. 8 and 9 within Macromedia Flash.

FIG. 9B shows a continuation of the flowchart of FIGS. 8 and 9 within Macromedia Flash.

FIG. 15 further shows an activated desaturation layer which converts to grayscale and removes the original color remnants, artifacts, and reflections as seen in FIGS. 12–14.

DETAILED DESCRIPTION

Figure 1:

Referring now to the drawings, the method and process for virtual paint application is shown in its preferred embodiment. The method and process is especially useful in applications where the painted look of a vehicle or other object is desired prior to physically applying paint or graphics to the vehicle or object.

A computer program listing appendix submitted herewith on a compact disc is incorporated-by-reference within this application. A transmittal letter complying with 37 CFR 1.52(e) is attached hereto.

This description portion of the present application hereby incorporates a computer program listing consisting of more than (300) lines. Said computer program listing complies with 37 CFR 1.96(c). The names of the files contained on each of the two compact discs, labeled "COPY 1" and "COPY 2", incorporated herein are "paint.txt", their date of creation is Aug. $17^{th}$, 2003 and their sizes in bytes are each 290 Kilobytes. The two compact discs labeled "COPY 1" and "COPY 2" are identical.

The present invention represents a unique method and process for virtually applying paint colors, paint fades, and graphics to an object displayed on a computer prior to physically applying the aforementioned. The method and process is especially useful for evaluation of various paint color schemes and combinations and graphics on various types of vehicles prior to actual physical application of the aforesaid. The method and process is implemented with the apparatus of a computer and the computer code or software, scripts, and files of the present art. The method and process is also capable of operation over the internet when hosted by a server computer.

The apparatus, in a preferred embodiment, allows a user to preview different paint colors on a variety of vehicles. (i.e. cars, trucks, motorcycles, etc.) It also enables the user to preview color combinations such as fades where two colors are on the same vehicle. In addition, the user can add multiple layer graphics to the vehicle. These graphics include flames, two tones, pinstripes and other miscellaneous graphics. Once a graphic has been selected the user can manipulate the size, rotational angle, and position of the graphic to create a limitless number of custom paint designs. The apparatus program also features a hand draw section where the user can actually draw a graphic on the vehicle. Once completed, the on-screen graphic design can be printed with the computer and utilized as a reference by the physical painter.

Figure 11:
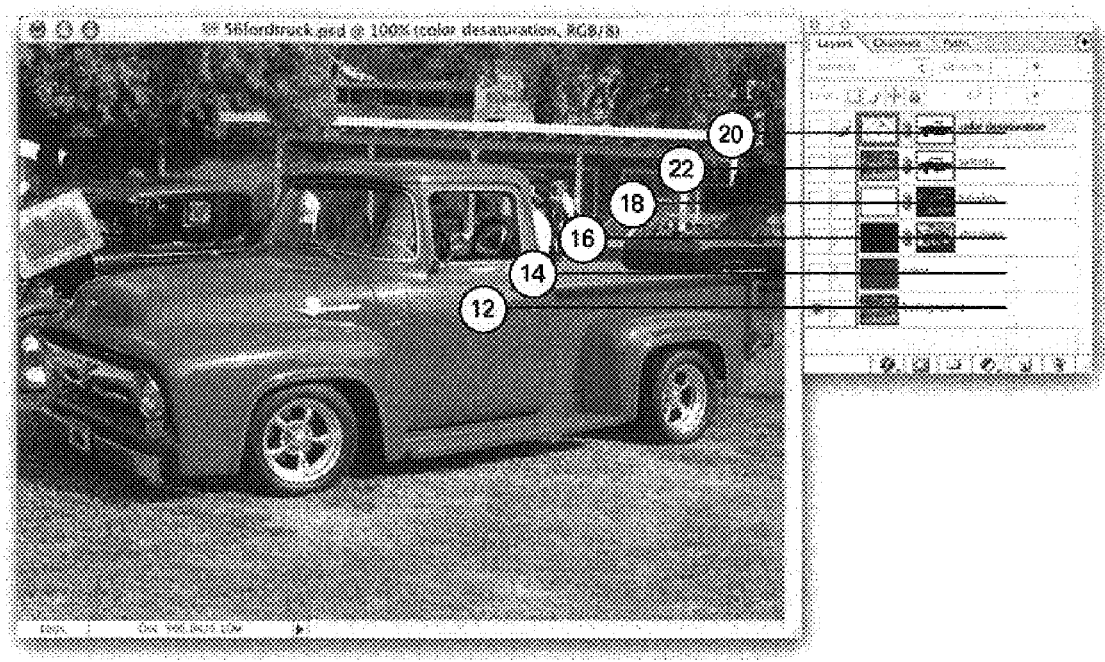
FIG. 11 shows a screen view of a vehicle image in Adobe Photoshop and the multiple layers used to manipulate and format the source image.
Figure 12:
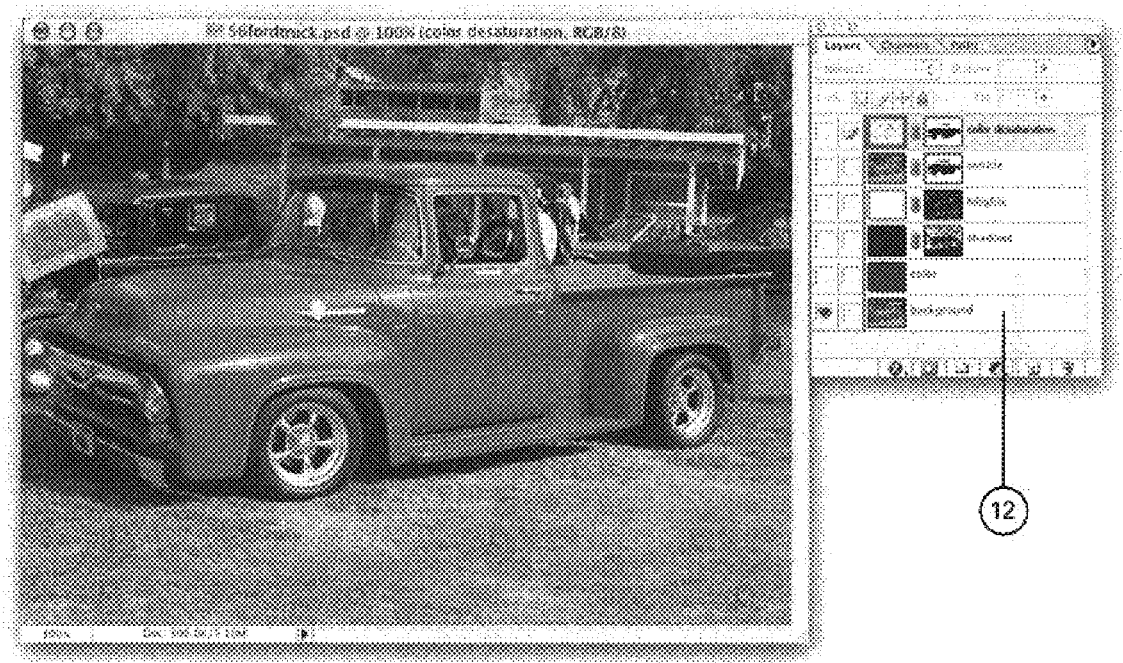
FIG. 12 shows a screen view of a vehicle image in Adobe Photoshop with all layers deactivated except the for the original vehicle image.

In a preferred embodiment, the software of the present art is created using two programs Adobe Photoshop and Macromedia Flash MX. Alternative embodiments may utilize any equivalent photo editing software and player software respectively. The vehicle image 12 which requires virtual painting and is captured in a digital form is first manipulated by the computer utilizing a photo editing program such as Adobe Photoshop or equivalent. Using multiple layers the highlights and shadows are separated by the photo editing program. Mask tools within said photo editing software are used to eliminate or isolate any unpaintable parts of the vehicle (i.e. tires, mirrors etc.) or object. These layers are saved as .SWF or .PNG files for import into Macromedia Flash MX. Once the layers are imported into Flash MX they are used to create the color, graphics, and hand draw ability. Both Adobe Photoshop and Macromedia Flash MX are capable of running on multiple computer platforms utilizing multiple operating systems including but not limited to Microsoft Windows, Apple operating systems, and Unix. The aforesaid is further shown and described in FIG. 11. Alternative embodiments may utilize other photo editing software packages other than Adobe Photoshop, provided said software allows for multiple layer placement of various vehicle portions and further provides for transparency of said layers. Photo editing programs utilize different names for the aforesaid layers, such as the term "objects" within Corel Photopaint, and other Adobe Photoshop terms. Although the present art application utilizes terms as found within Adobe Photoshop, this is not intended as a limitation of the scope and breadth of protection provided herein.

Figure 13:
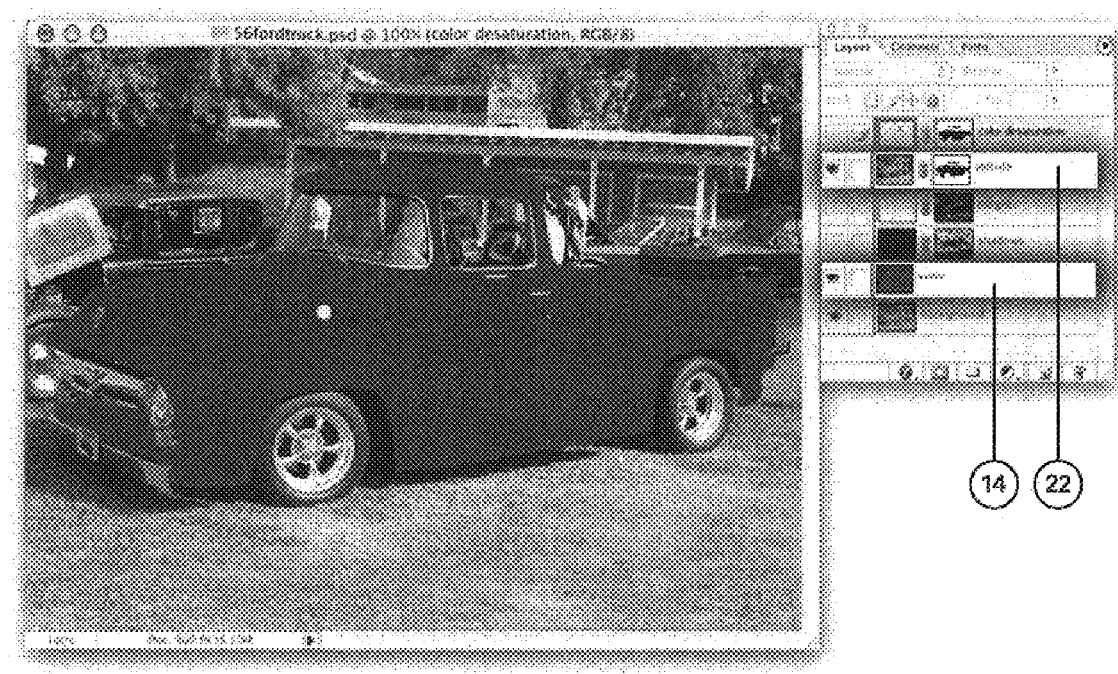
FIG. 13 shows a screen view of the activated matte shape layer having the vehicle image hole with an activated color layer below having the highlights and shadows not visible and the original color remnants, artifacts, and reflections visible.
Figure 14:
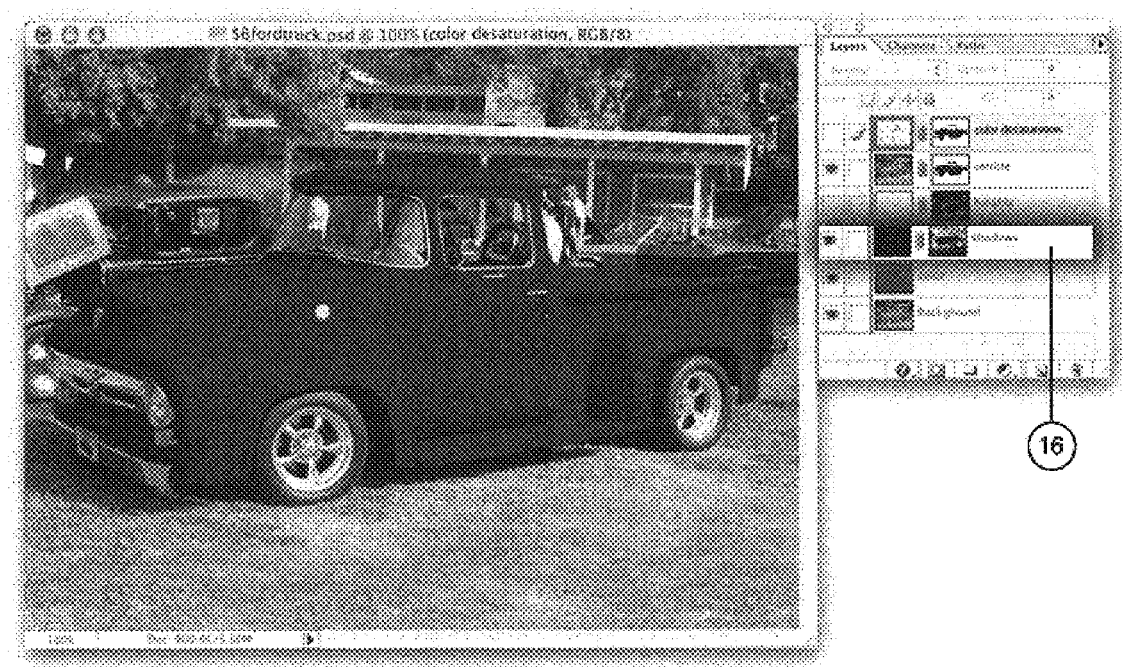
FIG. 14 shows the view of FIG. 13 with an activated shadow layer and associated matte visible and interposed between the color layer and the matte shape layer, thereby showing shadows of the underlying vehicle.
Figure 15:
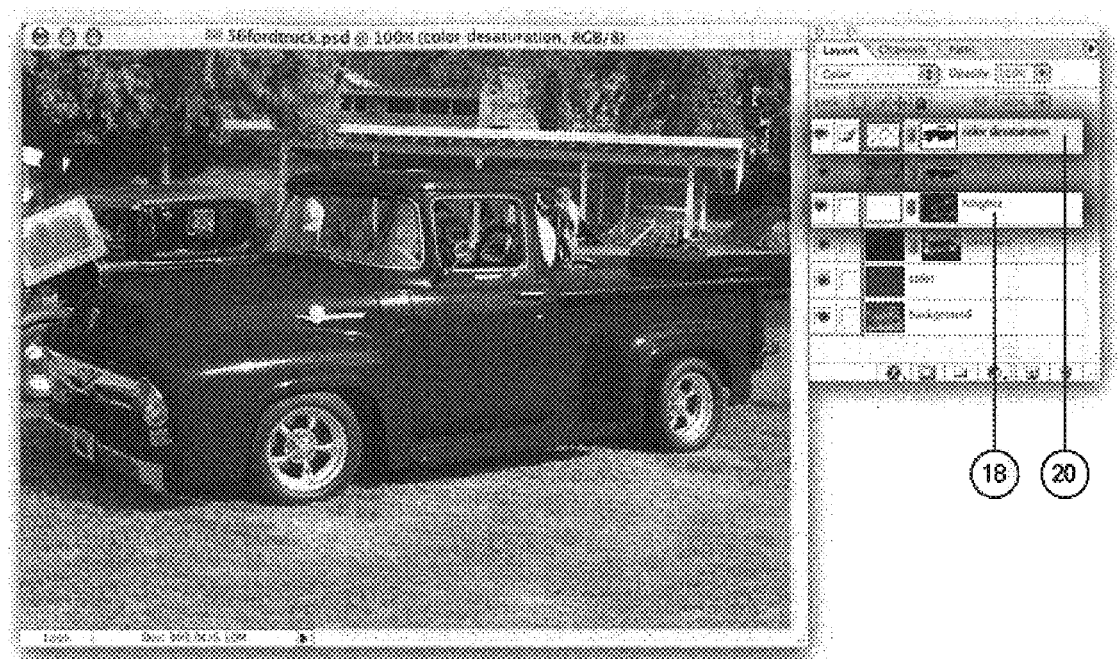
FIG. 15 shows the view of FIG. 14 with an activated highlight layer and associated matte visible and interposed between the shadow layer and the matte shape layer, thereby showing highlights such as reflections and insignias.

Processing begins within Adobe Photoshop or equivalent with the vehicle or object of interest first provided in a Jepeg or equivalent format image 12. The aforesaid Jepeg image 12 typically contains portions, including background, which will not receive a virtual paint application. In order to create the necessary file by which a player such as Macromedia Flash or equivalent may apply a user desired color or graphic only on the object of interest, a series of layers must be created which mask some areas and apply mattes of varying opacity to preserve shadows and highlights to other areas. A color layer 14, onto which the user's desired color is placed, is then placed above the original image 12. The aforesaid operation is visible in FIG. 13. Although the color layer 14 and original image layer 12 are deleted when converted to a .SWF or .PNG file for import into Macromedia Flash or equivalent, the image layer 12 is required to created the desired mattes or masks and the color layer is necessary to view the results of the aforesaid matte or mask creation.

A matte shape layer 22 of the paintable portions of the vehicle or object is then created manually by carefully tracing an outline of the colored portions of the vehicle or object or utilizing tools within the photo editing software to form a matte outline of said portions. The matte shape layer 22 is then placed above the aforesaid color layer 14. Again, the aforesaid operation is visible in FIG. 13. The matte shape layer 22 contains the original image 12 and the matte which creates the outline of the virtual paint application portions. This matte layer 22 creates a hole or see through template or matte outline which outlines the areas for virtual paint and which is used to filter all but the object color portions which require virtual paint. The matte shape layer 22 further allows the aforesaid color layer 14 to show through, yet also allows the background, i.e. non-virtual paint application portions, of the original image 12 to show or be seen as the top layer. That is, the visual effect of layers below the matte shape layer 22, are only seen within the hole or see through template outline of the matte with all remaining original image 12 background unaffected. A matte layer as described herein is also known as a clip mask, layer mask, or alpha matte in equivalent software packages such as Corel Photopaint or others. As recognized by one skilled in the art, multiple tools and techniques are available within photo editing software packages which assist in isolating only the colored portions of the vehicle or object which require virtual paint.

Upon completion of the aforesaid, a black shadow layer 16 is created with an inverted grayscale rendition of the original image utilized as a matte to modulate the transparency of the solid black. This shadow layer 16 is then added between the color layer 14 and the first matte shape layer 22 to create shadows. This operation relies upon the photo editing software characteristic that a pure black matte is transparent and a pure white matte is opaque or blocks the underlying layers. Since shadows are generally darker than the surrounding object color, a slight darkening of the underlying color layer 14 is required. That is, a whitening of the black shadow layer 16 matte where shadows are desired darkens the underlying color layer 14 as seen looking through the layers. Thus, for creation of the black shadow layer 16, a solid black layer is created above the color layer 14. An inverted grayscale rendition of the whole image is then placed as a matte within this black layer to created the black shadow layer 16. The contrast or threshold of the inverted grayscale rendition is then adjusted to optimize the shadowing effect with a minimum impact on the true color of the color layer. It is important to note that the black of the black shadow layer 16 is not a matte but simply a black color which is non-transparent. The transparency of the black is modulated by the inverted grayscale matte created from the original image 12.

Next within the process and method, a preferably solid white highlight layer 18 with a grayscale matte of the original image 12 is added between the aforesaid black shadow layer 16 and the matte shape layer 22. This layer 18 utilizes a non-inverted grayscale rendition as a matte of the area to be painted to create highlights. That is, since white is a more opaque matte, the original whiter highlights of the image are partially or substantially blocked and instead the solid white of the highlight layer 18 provides a white tint to said whiter highlights. The blacker areas of the matte for the highlight layer 18 allow the underlying aforesaid components, i.e. color and shadows, to be seen through the solid white. That is, those areas that are more white are modulated by the white background of this layer to become brighter given the opacity of the layer and those areas that are more black allow for more transparency or see through to lower layers. The contrast or threshold of the aforesaid matte is then adjusted to provide the desired highlight effects with a minimum impact on the true color of the color layer.

A desaturation layer 20 is then placed above all of the aforesaid layers to remove reflection remnants of the original color. That is, remnants of the original color can typically be seen as reflections on glass, chrome, or other portions of the image which do not receive virtual paint. In order to optimize the resultant image, these remnants must be removed. Since the human eye generally does not distinguish colors in finely detailed items, the aforesaid color remnants may be covered with a grayscale, i.e. converted to black and white, to remove the old color effects. The desaturation layer 20 is comprised of a transparent layer having a matte of the same shape as the matte shape layer 22 matte. The matte allows for transparent viewing of all layers within the outline of the matte, i.e. virtual paint application portions, and below the desaturation layer 20. On the transparent portion of the desaturation layer 20 where remnants exist and not the matte itself, black is painted over the remnants as a hue layer blending mode to create a grayscale of the remnants on the transparent layer. That is, the black transforms the underlying remnant color to a black or grayscale hue. The desaturation layer 20 matte represents the portions of the desaturation layer 20 which are unaffected by this paint over procedure. The contrast or threshold of the aforesaid paint over is then adjusted, if necessary, to provide the desired edit of the remnants.

Upon completion of the aforesaid, the grayscale threshold or contrast of the grayscale matte of the shadow layer 16, the grayscale matte of the highlight layer 18, or the black hue of the transparency portions of the desaturation layer 20 may be adjusted to maximize highlight and shadow effects and minimize remnant color. In a preferred embodiment, this adjustment takes the form of adjusting the grayscale threshold of said layer portions whereby portions of the grayscale are converted to pure black or pure white in order to optimize the object or virtual paint application portion appearance. Alternative embodiments may utilize a plurality of adjustments to said layers, including but not limited to contrast, hue, opacity, and saturation in order to optimize said appearance.

Upon completion of the aforesaid, the color layer 14, is deleted and the desaturation layer 20, matte shape layer 22, shadow layer 16, and highlight layer 18, are saved together as a layer collection 24 as a .SWF or .PNG file for import into Macromedia Flash or equivalent. Alternative embodiments may save said layer collection 24 as a .GIF, .XWF, or any file that carries transparency with it. The Macromedia Flash or equivalent program allows the user to place a desired virtual paint, shading, or graphics under the aforesaid saved layers and thereafter view the effects through the aforesaid layers with shadows and highlights intact. Thus, the user is able to only effect those portions where virtual paint is desired while preserving shadows and highlights and not affect the background of the original image. Alternative embodiments may utilize any authoring environment in place of Macromedia Flash such as Visual Basic, Power Point, Microsoft Paint, or any programming language that can accept the aforesaid file formats.

Figure 2:
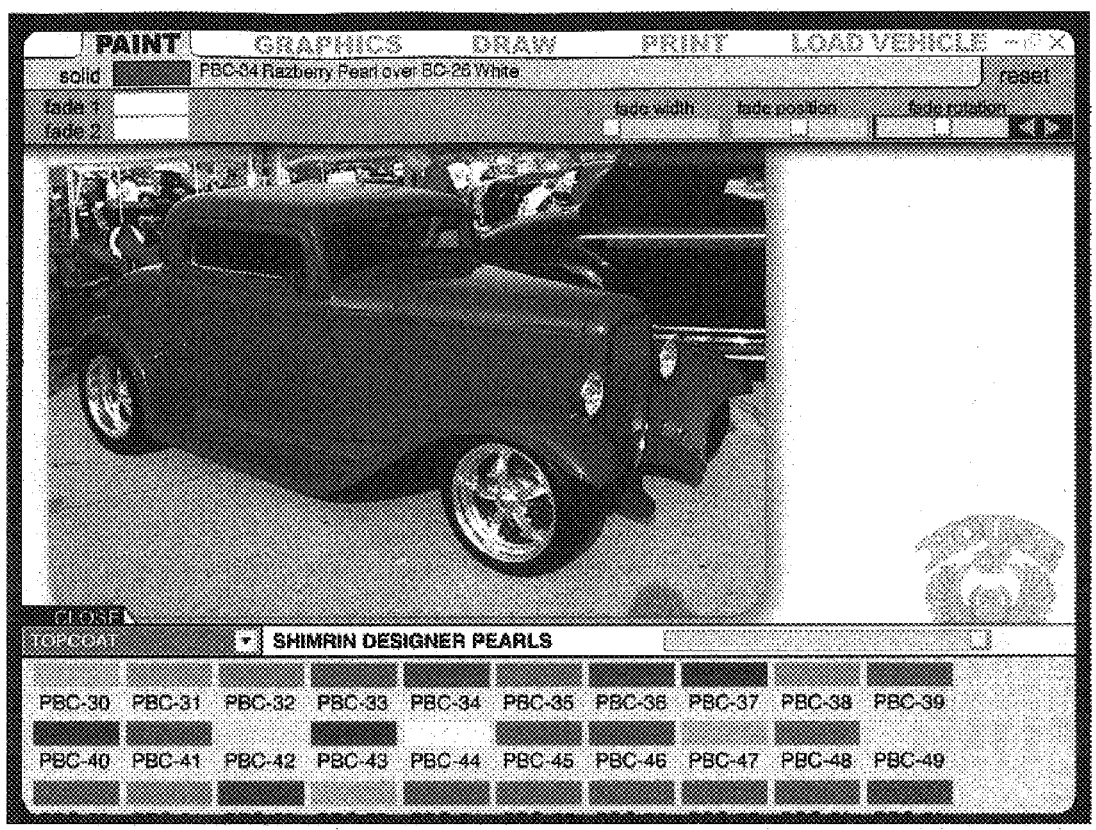
FIG. 2 shows a screen view of the basecoat and topcoat paint selection screen within Macromedia Flash.
Figure 3:
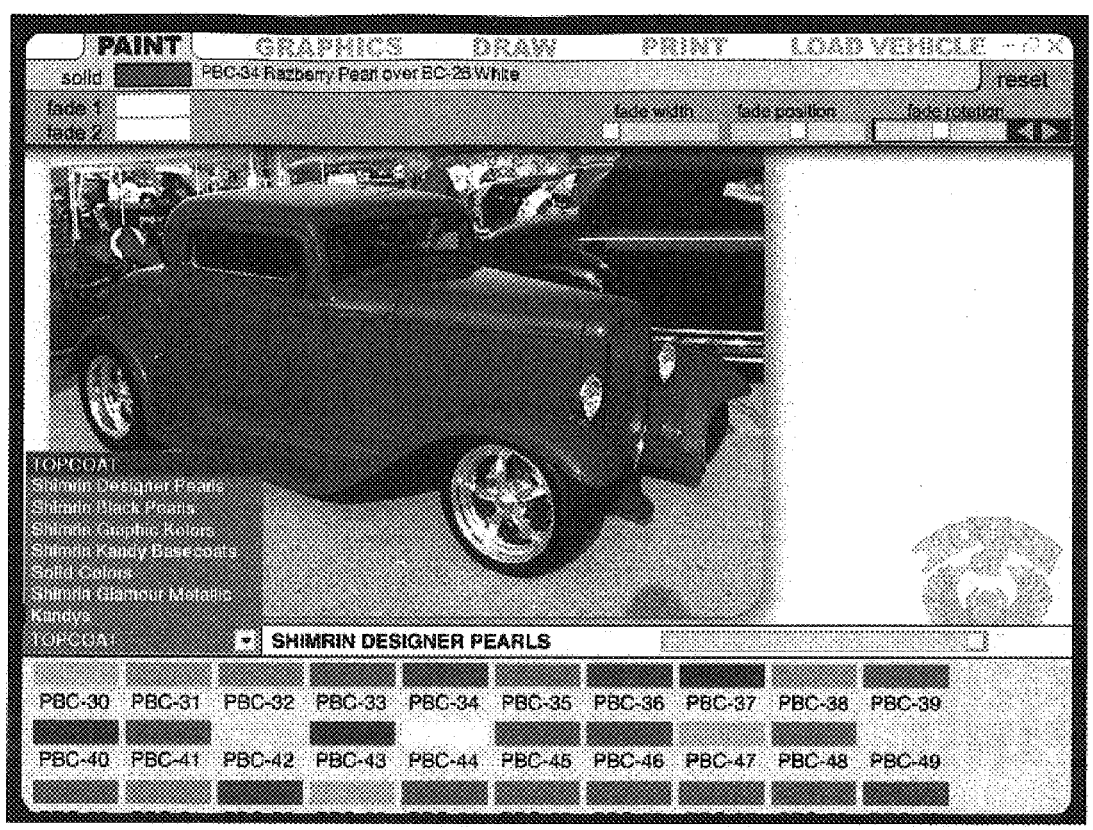
FIG. 3 shows a screen view of a pop-up menu for topcoat selection within Macromedia Flash.
Figure 7:
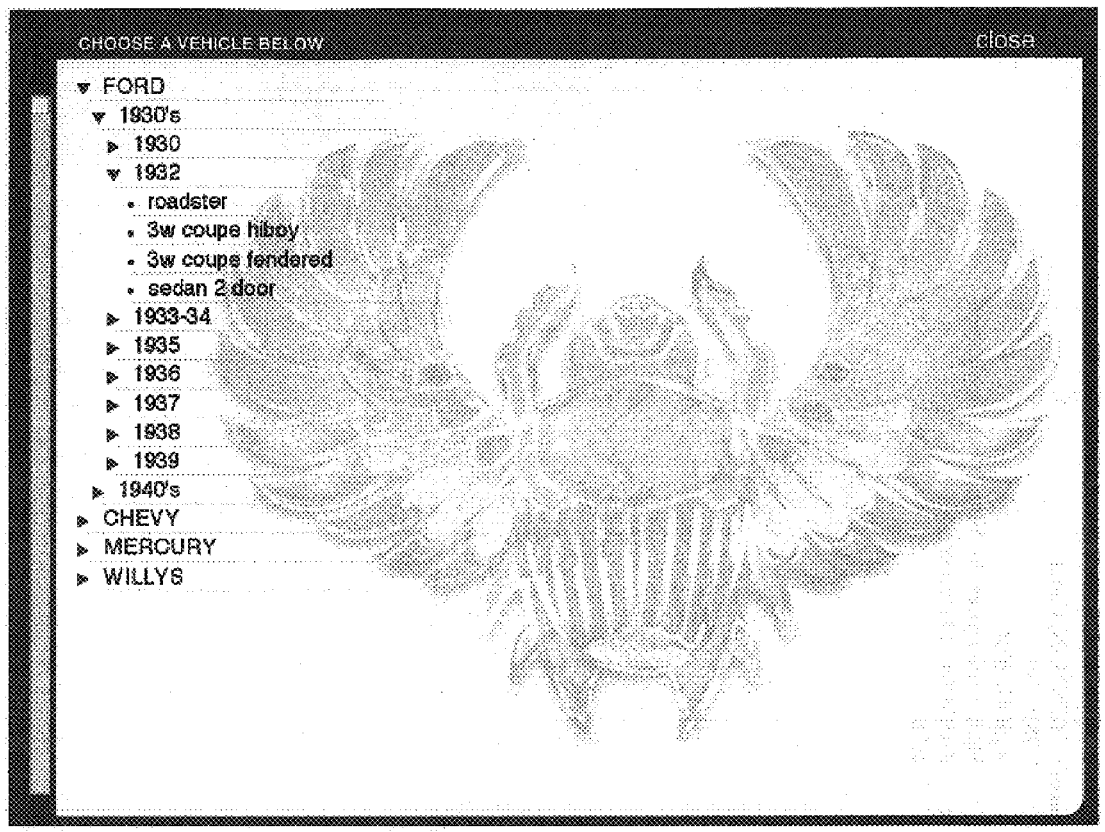
FIG. 7 shows a screen view of the pop up menu for selecting vehicle type within Macromedia Flash.

Once the aforesaid layers are defined, the aforesaid layer collection 24 file is processable by the Macromedia Flash MX player program or equivalent. The code or action scripts for providing the functionality described herein with Macromedia Flash MX is included herewith as a file entitled "virtual_paint.txt". The code or action scripts can be utilized remotely over a network or the internet with a browser and Flash plug-in or downloaded for use with a computer having Macromedia Flash Nor downloaded as an executable with an embedded version of Macromedia Flash. For use with vehicle or other object virtual painting, in Macromedia Flash MX, the user first selects the type of vehicle or object which he/she desires to apply paint and graphics to. This vehicle or object represents the file created with Adobe Photoshop. The aforesaid is performed by mouse clicking the load vehicle tab as seen in FIG. 1 and then selecting from the pop up menu as presented in FIG. 7. The user then virtually selects and applies the desired basecoat and topcoat paints as shown in FIG. 2. The user may select types of topcoats from a pop-up menu as shown in FIG. 3. The user may also select fade position, width, and rotation for the aforesaid virtual paint application. If the user desires to utilize the fade options, the user chooses the fade paint colors which are desired and sets the mask for said colors. The user may then rotate, position, and adjust the size of various fade positions. All of the aforesaid are applied to one or more layers which were originally defined and deemed paintable during the Adobe Photoshop operation. That is, the virtual colors, paints, fades, masks, and graphics are applied below the aforesaid layer collection 24 and are visible only through the mattes as described. Thus, only the vehicle paintable portions are seen with the new user desired virtual paint, fades, and graphics. This technique make it easy and convenient for the user as the user cannot apply any of the aforesaid paints or graphics to any portion except the paintable portions defined with the aforesaid mattes.

Figure 4:
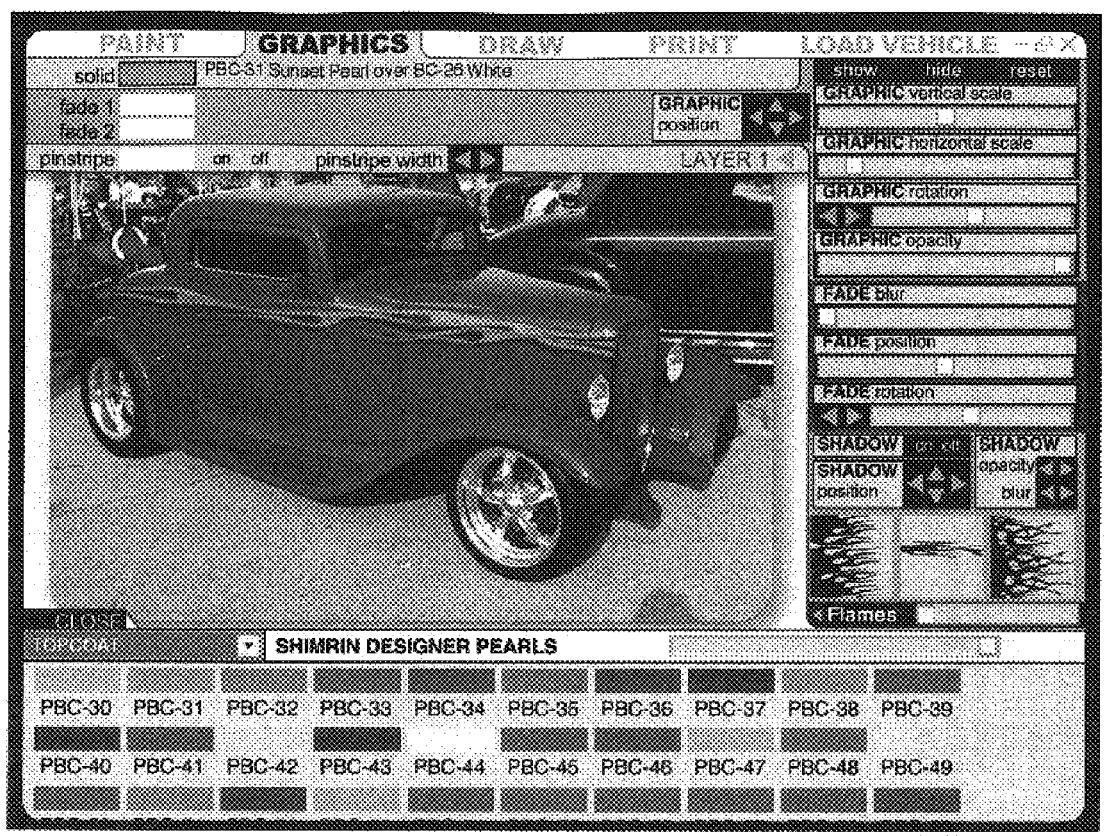
FIG. 4 shows a screen view of the graphics application pop-up portion with a graphics style and color selected within Macromedia Flash.

If the user desires a graphic pattern such as flames, he/she may click on the graphics tab to activate the graphics application portion of the program. FIG. 4 shows the graphics application pop-up menu portion with a graphics style and color selected. The user may select from a plurality of graphics and graphic colors. The user may also rotate, size, vertically and horizontally position, and apply a fade to said graphics. Again, all of the aforesaid are applied below the one or more layers which were originally defined and deemed paintable during the Adobe Photoshop or equivalent operation.

Figure 5:
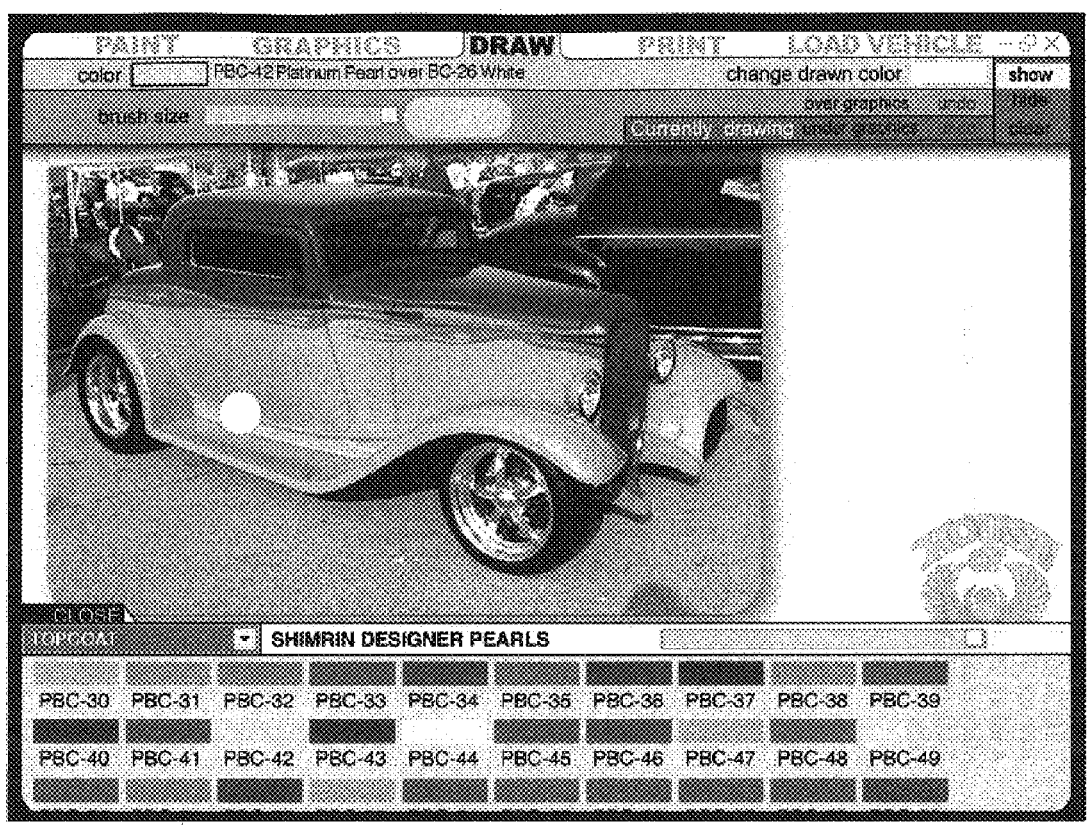
FIG. 5 shows a screen view of a hand drawn design window within Macromedia Flash.

The apparatus of the present invention further allows the user to draw a user desired design onto the vehicle selected under the "DRAW" tab. The user may select a brush width and color and further place said user design over or under the graphics previously applied. FIG. 5 illustrates said hand drawn design.

Figure 6:
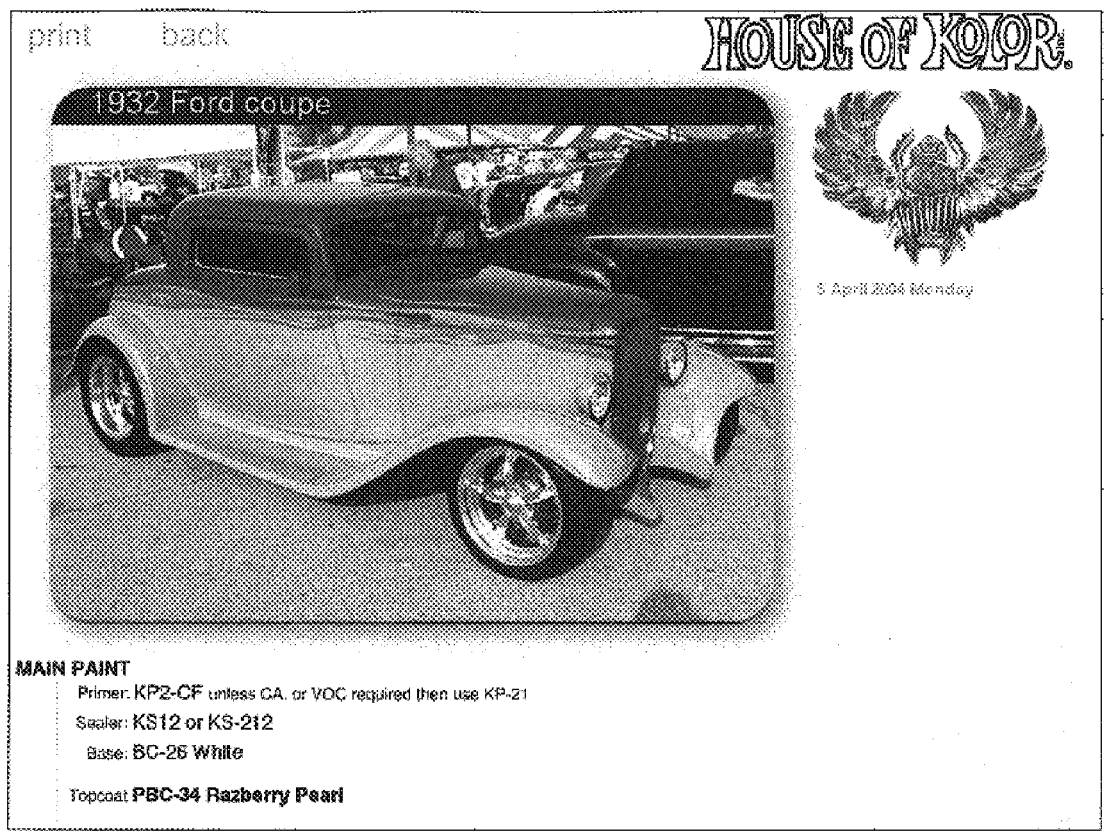
FIG. 6 shows a screen view of a print pop-up screen which is shown prior to printing within Macromedia Flash.

Upon completion of the aforementioned, the user may print the user's design through the computer on which the apparatus software is running or under the Macromedia Flash MX player plug-in. FIG. 6 illustrates the print pop-up screen which is shown prior to printing.

It is important to note that Macromedia Flash MX is capable of producing an executable file ".exe" into which is embedded the Macromedia Flash MX player. This allows the user to use the functional features of the program without Macromedia Flash MX player plug-in installed on the computer. Macromedia Flash MX also allows the code to be saved in a non-executable form. This non-executable form requires that a user has a Macromedia Flash MX plug-in for use within a browser. The non-executable form is especially useful for internet or other network virtual paint application.

Figure 8:
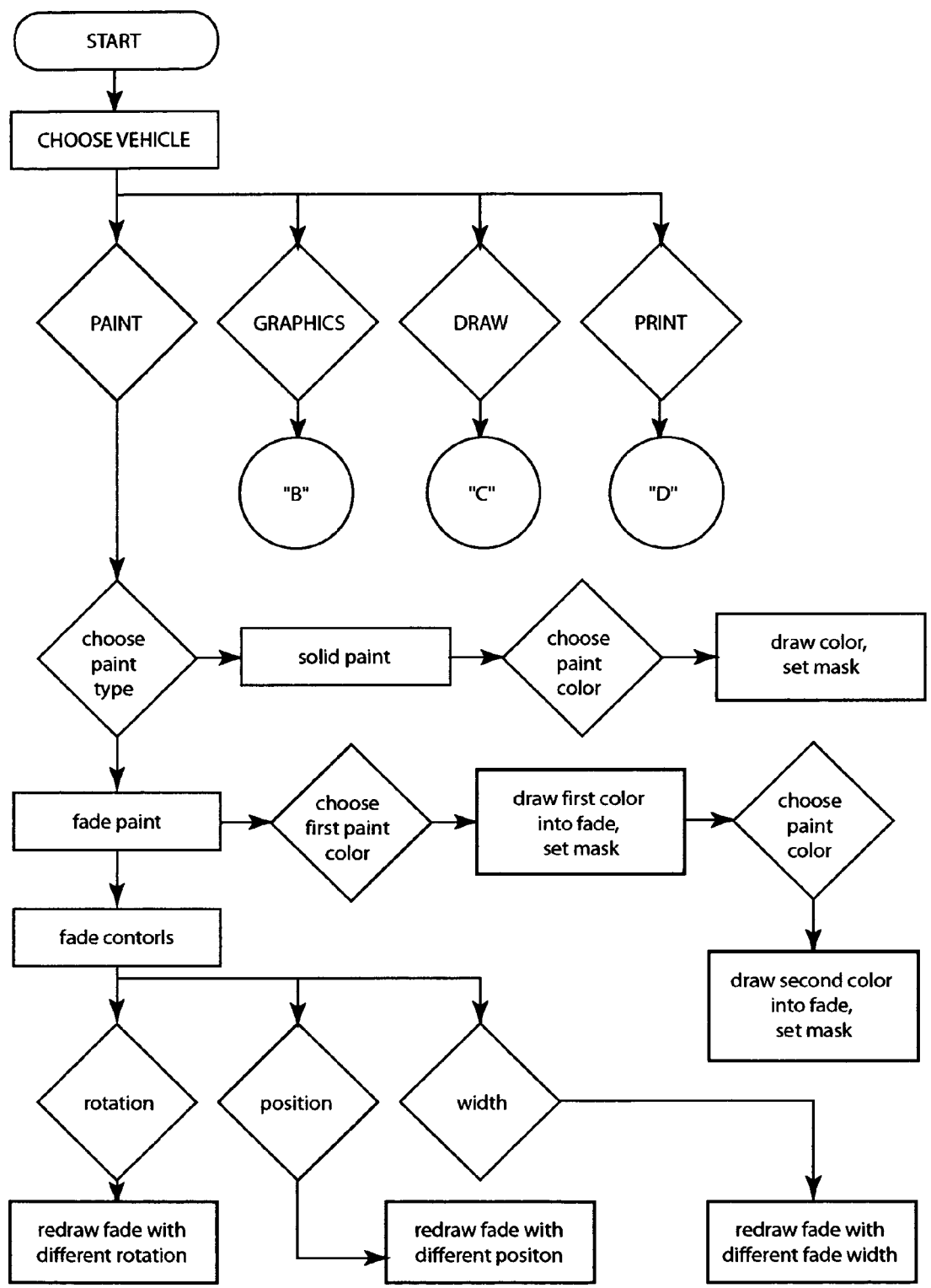
FIG. 8 shows a flowchart for the software operation within Macromedia Flash.
Figure 9:
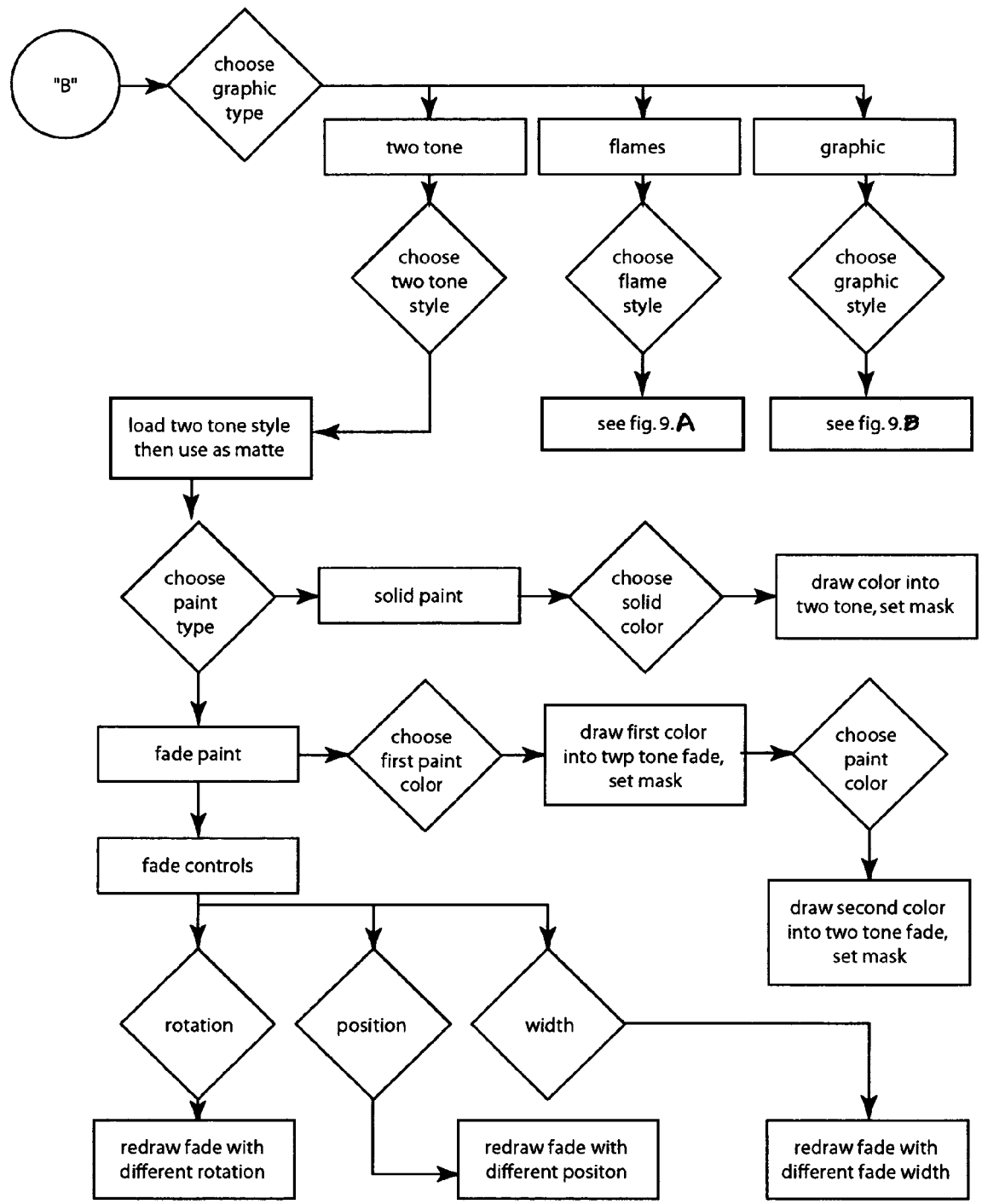
FIG. 9 shows a continuation of the flowchart of FIG. 8 within Macromedia Flash.
Figure 9:
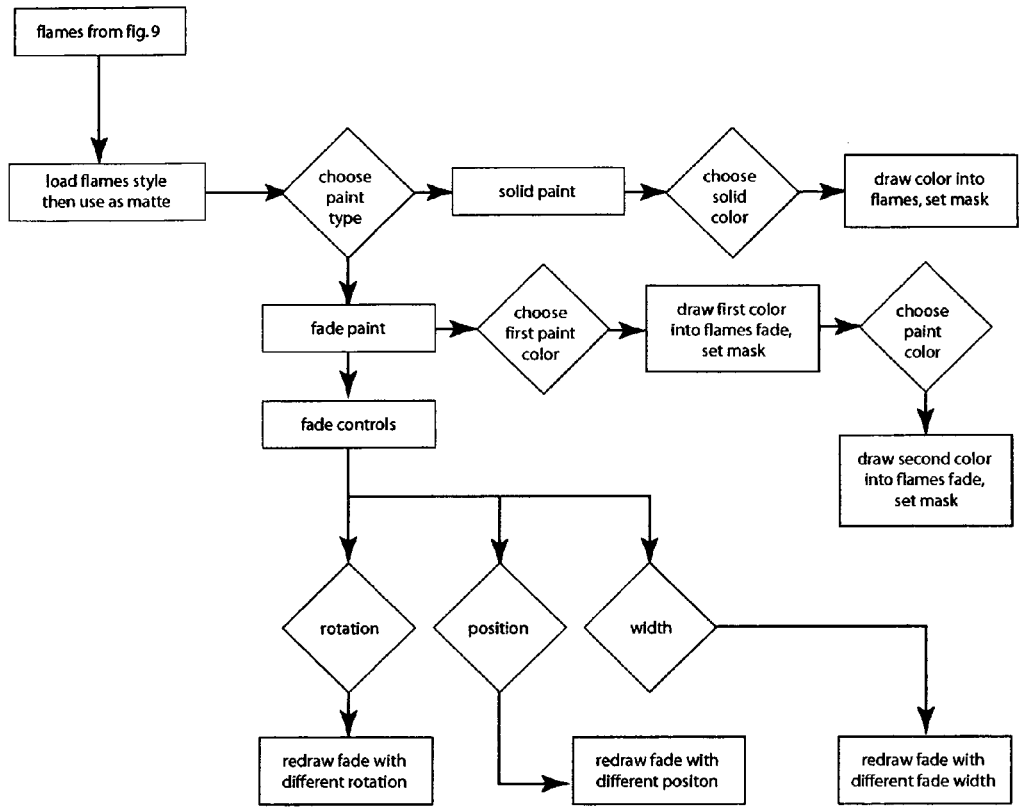
Figure 9:
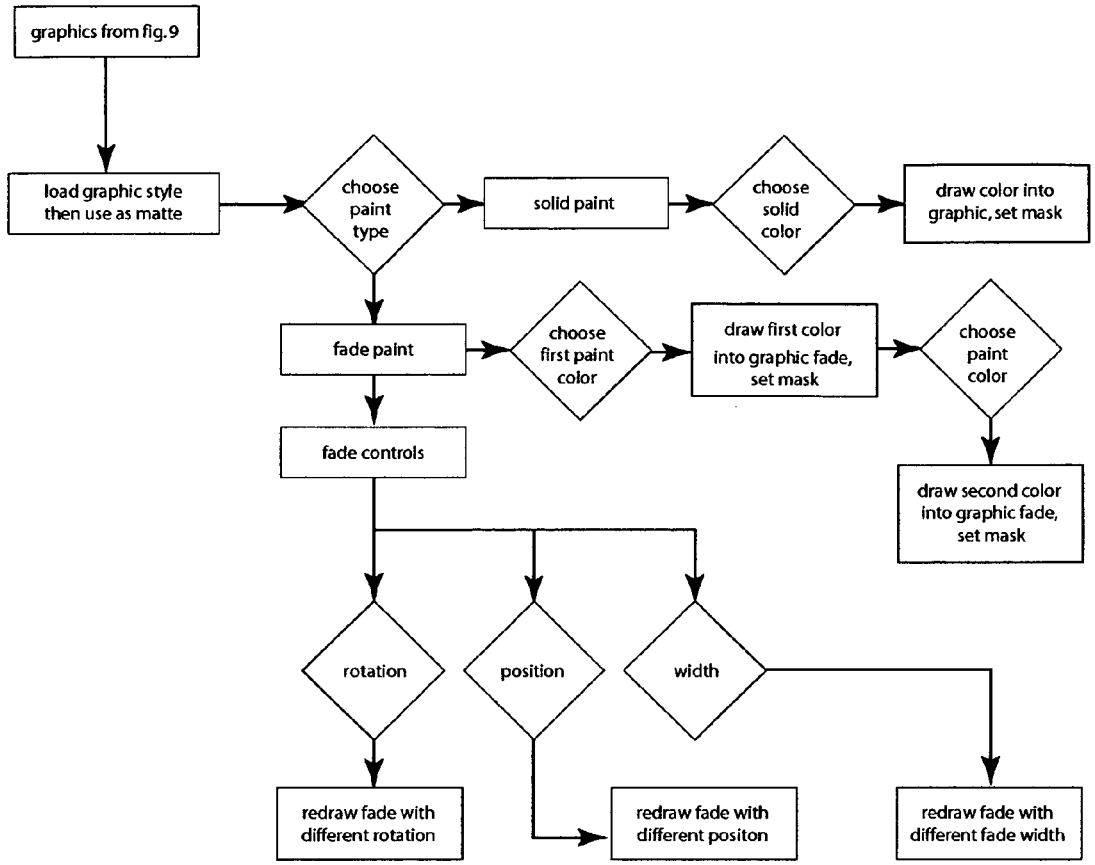
Figure 10:
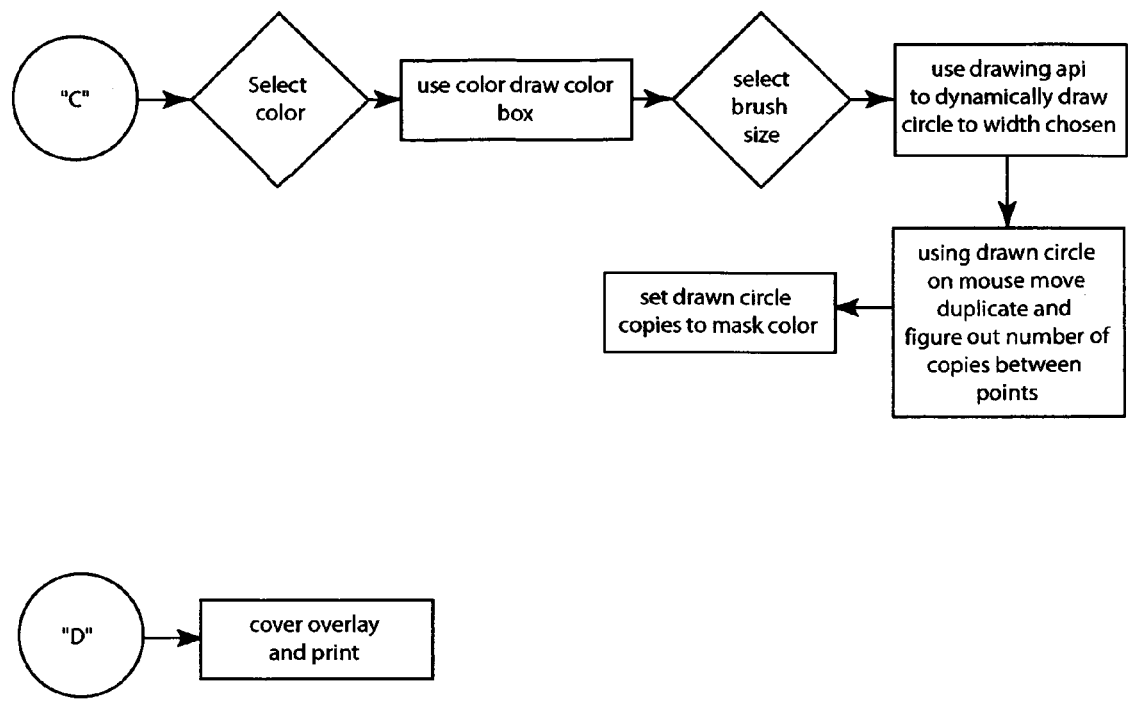
FIG. 10 shows a continuation of the flowchart of FIG. 8 within Macromedia Flash.

The aforesaid operations of the software running under Macromedia Flash MX are shown and described in the flow chart form in FIGS. 8, 9, & 10. That is, the user selects a vehicle, then selects the PAINT, GRAPHICS, DRAW, or PRINT operations and follows the options presented. If the user chooses PAINT, a solid color or fade with more than one color may then be selected. When utilizing the fade paint option, the user may then set a mask to contain each color of choice and further control the rotation, position, and width of the fade. If the user desires graphic application, the user may select two tone, flames, or graphics to apply. With all of the aforesaid, the user may fade, rotate, or control the width of the applied graphic. If the user desires to hand draw a design, the user then selects a color and brush size and begins the drawing operation. Upon completion of the aforesaid virtual application, the user may print and save the file created. The completed virtual print may then be utilized as a template for physical paint application to the object originally depicted in the original image 12.

A unique aspect of the present invention is the ability to apply virtual paint or graphics to any object image and see the object with a new paint color before physically applying the aforesaid. This is especially useful for persons with vehicles which require new paint. The person can upload the original image 12 over a network or the internet, the aforesaid photo processing techniques can be applied to the original image 12, and then the final layer collection 24 may be utilized for virtual paint application by the person utilizing an authoring environment such as Macromedia Flash or equivalent. The colors applied for application through the authoring environment are preferably from a color chart of a paint manufacturer. This allows the person to purchase a specific paint for physical application which matches the virtual color applied.

From the foregoing description, those skilled in the art will appreciate that all objects of the present invention are realized. A method and process for virtual paint application is shown and described. The method and process allows for virtual paint application to an image while preserving the background, shadows, and highlights. The method and process further provides for easy interface to a person not skilled in the art. The method and process also provides a realistic virtual representation of the object with a new paint or graphics scheme without the requirement of a physical paint or graphics application.

Having described the invention in detail, those skilled in the art will appreciate that modifications may be made to the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A process for virtual paint application comprising:
    capturing an image in a digital form, said image containing one or more portions onto which virtual paint or graphics shall be applied; and
    utilizing a photo editing software program capable of utilizing layers having transparency properties with a computer to manipulate said image in a digital form; and
    creating a matte shape layer with said photo editing software, said matte shape layer having a copy of said original image and one or more matte outlines of said portions of said original image onto which said virtual paint or graphics shall be applied whereby layers below said matte shape layer are visible through an area bounded by said matte outline and an area of said original image of said matte shape layer outside of said matte outline is visible; and
    creating a shadow layer below said matte shape layer, said shadow layer comprising a black layer having a matte created from an inverted grayscale representation of said original image having at least said portions of said original image which fall within said matte outline; and
    saving said layers as described without said original image as a file in a format which is capable of carrying transparency; and
    reading said file with an authoring environment program; and
    utilizing said authoring environment program to place one or more virtual paint colors or one or more graphics or one or more basecoats or one or more topcoats or one or more fades or one or more masks below said layers whereby said virtual paint color or graphic or basecoat or topcoat or fade or mask is seen through said layers within one or more of said matte outlines.

2. The process for virtual paint application as set forth in claim 1 further comprising:
    creating a highlight layer below said matte shape layer, said highlight layer comprising a white layer having a matte created from a grayscale representation of said original image having at least said portions of said original image which fall within said matte outline.

3. The process for virtual paint application as set forth in claim 2 further comprising:
    creating a desaturation layer above said matte shape layer, said desaturation layer comprising a transparent layer having a matte with substantially equivalent outlines as said matte in said matte shape layer; and
    applying a hue layer blending mode of black to those portions of said transparent layer which represent one or more remnants from a color of said original image whereby said remnants are converted to grayscale.

4. The process for virtual paint application as set forth in claim 3 further comprising:
    placing a color layer below said shadow layer whereby said color layer represents a virtual paint color to be viewed through said mattes prior to saving said layers as a file in a format which is capable of carrying transparency; and
    removing said color layer prior to saving said layers as a file in a format which is capable of carrying transparency.

5. The process for virtual paint application as set forth in claim 3 said placement of said virtual paint or graphics further comprising:
    selecting an object from a menu within said authoring environment program whereby reading said file with said authoring environment program occurs; and
    selecting said color or basecoat or topcoat or fade or mask or graphic one or more times from a menu; and
    applying said color or basecoat or topcoat or fade or mask or graphic one or more times below said layers whereby said authoring environment program is utilized and said color or basecoat or topcoat or fade or mask or graphic is substantially seen within said matte outlines.

6. The process for virtual paint application as set forth in claim 5 whereby:
    said utilizing of said authoring environment occurs over a network.

7. The process for virtual paint application as set forth in claim 5 whereby:
    said object is a vehicle or house.

8. The process for virtual paint application as set forth in claim 6 whereby:
    said object is a vehicle or house.

9. The process for virtual paint application as set forth in claim 6 whereby:
    said network is the internet.

10. The process for virtual paint application as set forth in claim 1 whereby:
    said format of said layers saved as a file comprises a .SWF or .PNG or .GIF or .XWF format.

11. The process for virtual paint application as set forth in claim 1 whereby:
    said original image is supplied by a user desiring virtual paint applied to an object comprising said one or more portions; and
    said loading of said original image is performed through a network.

12. A method for virtually viewing the application of paint or graphics to an object, the steps comprising:
    capturing an object image in a digital form which may be manipulated by a computer utilizing
    a photo editing software package; and
    creating a first layer with a copy of said object within said photo editing software; and
    creating a matte within said first layer which isolates only the object or portions thereof which require virtual paint applied, said first layer matte providing a hole through which layers below said first layer may be seen; and
    creating a second layer of substantially white within said photo editing software below said first layer; and
    creating a matte within said second layer, said matte having a grayscale representation of said object whereby portions of said grayscale which are more white allow more of the substantially white second layer to be seen more prominently through said first layer matte and portions of said grayscale which are more black allow the layers below said second layer to be seen more prominently through said first layer matte; and saving all of said layers including any attached said mattes as a file in a format which is capable of carrying transparency and is also capable of allowing an authoring environment program to place virtual paint or graphics on a layer below said saved layers; and reading said file with said authoring environment program; and utilizing said authoring environment program to place one or more virtual paint colors or one or more graphics or one or more basecoats or one or more topcoats or one or more fades or one or more masks below said layers whereby said virtual paint, graphic, basecoat, topcoat, or fade is seen on said object through said layers.

13. The method for virtually viewing the application of paint or graphics to an object as set forth in claim 12, the steps further comprising:

creating a third layer of substantially black within said photo editing software below said first layer; and creating a matte within said third layer, said matte having an inverted grayscale representation of said object whereby portions of said inverted grayscale which are more white allow more of the substantially black third layer to be seen more prominently through said first layer matte and portions of said inverted grayscale which are more black allow more of the layers below said third layer to be seen more prominently through said first layer matte.

14. The method for virtually viewing the application of paint or graphics to an object as set forth in claim 13, the steps further comprising:

creating a fourth substantially transparent layer above said first layer, said fourth layer having a matte substantially equivalent to said first layer matte; and utilizing a hue layer blending mode of black within said photo processing software to convert undesired remnants within said fourth layer transparency to grayscale.

15. The method for virtually viewing the application of paint or graphics to an object as set forth in claim 14, the steps further comprising:

creating a fifth layer of a desired color below said first, second, third, and fourth layers whereby said color may be substantially seen within said isolated object portions of said first layer matte; and deactivating said fifth layer prior to saving said layers as a file in a format which is capable of carrying transparency.

16. The method for virtually viewing the application of paint or graphics to an object as set forth in claim 15, the steps further comprising:

adjusting the grayscale threshold of said second layer matte or said third layer matte or said fourth layer black hue whereby portions of the grayscale are converted to pure black or pure white thereby optimizing said object appearance.

17. The method for virtually viewing the application of paint or graphics to an object as set forth in claim 16, the steps further comprising:

creating and compiling an action script for use with said authoring environment, said action script providing menus for reading said file and for application of said virtual paints, graphics, basecoats, topcoats, or fades; and utilizing said action script with said authoring environment.

18. The method for virtually viewing the application of paint or graphics to an object as set forth in claim 17, the steps further comprising:

creating and compiling said action script whereby a menu is provided for printing the representation of said object upon placement of said virtual paint, graphic, basecoat, topcoat, or fade.

19. The method for virtually viewing the application of paint or graphics to an object as set forth in claim 17, whereby:

said object is a vehicle or house.

* * * * *